(12) United States Patent
Stayman et al.

(10) Patent No.: US 9,305,379 B2
(45) Date of Patent: Apr. 5, 2016

(54) METHODS AND SYSTEMS FOR TOMOGRAPHIC RECONSTRUCTION

(71) Applicant: The Johns Hopkins University, Baltimore, MD (US)

(72) Inventors: Joseph Webster Stayman, Baltimore, MD (US); Jeffrey H. Siewerdsen, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 14/370,743

(22) PCT Filed: Jan. 10, 2013

(86) PCT No.: PCT/US2013/020942
§ 371 (c)(1),
(2) Date: Jul. 3, 2014

(87) PCT Pub. No.: WO2013/106512
PCT Pub. Date: Jul. 18, 2013

(65) Prior Publication Data
US 2014/0363067 A1 Dec. 11, 2014

Related U.S. Application Data

(60) Provisional application No. 61/584,887, filed on Jan. 10, 2012.

(51) Int. Cl.
*G06K 9/00* (2006.01)
*G06T 11/00* (2006.01)
*G06T 7/00* (2006.01)

(52) U.S. Cl.
CPC ............. *G06T 11/008* (2013.01); *G06T 7/0038* (2013.01); *G06T 11/005* (2013.01); *G06T 2207/10081* (2013.01)

(58) Field of Classification Search
USPC .......................................................... 382/131
See application file for complete search history.

(56) References Cited

U.S. PATENT DOCUMENTS 6,630,828 B1   10/2003   Mistretta et al.
7,881,510 B2   2/2011    Doyle
(Continued)

FOREIGN PATENT DOCUMENTS

KR   1020100004321    12/2011
WO   WO-2007095312 A2  8/2007
WO   WO-2011101752 A1  8/2011

OTHER PUBLICATIONS

Anastasio, M. A., Sidky, E. Y., Pan, X., & Chouc, C. (2009). "Boundary reconstruction in limited-angle x-ray phase-contrast tomography." Paper presented at the Progress in Biomedical Optics and Imaging—Proceedings of SPIE, 7258 (7 pages).
(Continued)

*Primary Examiner* — Yon Couso
(74) *Attorney, Agent, or Firm* — Ballard Spahr LLP

(57) ABSTRACT

A method for processing an image of a series of images includes receiving first data representing a first previously reconstructed image and receiving second data representing a second image. A second image is reconstructed in accordance with the first data, the second data and a noise model. The noise model is a likelihood estimation. The second image is reconstructed in accordance with a penalty function. The penalty function is a roughness penalty function. The penalty function is updated by iteratively adjusting an image volume estimate. The penalty function is updated by iteratively adjusting a registration term. The penalty function is a prior image penalty function and the prior image penalty function and a registration term are jointly optimized. The penalty function is determined in accordance with a noise model. The function is a p-norm penalty function.

21 Claims, 8 Drawing Sheets

(56) References Cited

U.S. PATENT DOCUMENTS

| | | |
|---|---|---|
| 7,983,465 B2 | 7/2011 | Leroux et al. |
| 2008/0205731 A1 | 8/2008 | Busch et al. |
| 2009/0116717 A1 | 5/2009 | Kohler et al. |
| 2009/0161932 A1 | 6/2009 | Chen |
| 2010/0011268 A1* | 1/2010 | Sinop et al. .............. 714/746 |
| 2010/0054393 A1* | 3/2010 | Vija et al. .............. 378/4 |
| 2010/0207629 A1 | 8/2010 | Trzasko et al. |
| 2011/0052023 A1* | 3/2011 | Garg et al. .............. 382/131 |
| 2011/0164031 A1 | 7/2011 | Shi |
| 2013/0221961 A1* | 8/2013 | Liu, Tian .............. 324/307 |
| 2013/0287279 A1* | 10/2013 | Roessl et al. .............. 382/131 |

OTHER PUBLICATIONS

Boufounos, P., Duarte, M. F., & Baraniuk, R. G. (2007). "Sparse signal reconstruction from noisy compressive measurements usingcross validation." Paper presented at the IEEE Workshop on Statistical Signal Processing Proceedings (pp. 299-303).

J. W. Stayman, W. Zbijewski, Y. Otake, S. Schafer, J. Lee, J. L. Prince, J. H. Siewerdsen, "Penalized-Likelihood Reconstruction for Sparse Data Acquisitions with Unregistered Prior Images and Compressed Sensing Penalties," Proceedings of SPIE vol. 7961, pp. 79611L-1—6, 2011 (6 pages).

Langet, H., Riddell, C., Trousset, Y., Tenenhaus, A., Lahalle, E., Fleury, G., et al. (2011). "Compressed sensing based 3D tomographic reconstruction for rotational angiography" (8 pages).

* cited by examiner

METHODS AND SYSTEMS FOR TOMOGRAPHIC RECONSTRUCTION

CROSS-REFERENCE TO RELATED APPLICATIONS

This application is a National Phase Application of International Application No. PCT/US2013/020942, filed Jan. 10, 2013, which claims priority to U.S. Patent Application No. 61/584,887, filed Jan. 10, 2012, both of which are incorporated herein fully by this reference.

BACKGROUND

There are numerous clinical situations where repeated tomographic acquisitions are prescribed. For example, in lung cancer treatment such scans are used both for diagnostics as well as image-guided procedures. Specifically, repeated surveillance scans are used diagnostically to monitor nodule size over the course of treatment. Similarly, Computed Tomography (CT) may be used in a cine mode to guide a biopsy needle, wherein the cine mode provides a series of rapidly recorded multiple image volumes taken at sequential cycles of time. In both cases, there tends to be substantial similarity between the images in the acquisition sequence. Such similarities have previously been exploited in reconstruction methods as image priors for subsequent reconstructions from sparse data acquisitions, most notably in prior image constrained compressed sensing (PICCS) reconstructions. These sparse acquisitions can be angularly undersampled, limited arcs, and/or highly truncated, providing the opportunity for significant dose reductions or decreased acquisition times. Analogous acquisition and reconstruction problems exist on other imaging modalities (e.g. magnetic resonance imaging).

PICCS reconstruction relies on compressed sensing norms that are well suited to ill-posed problems due to their ability to enforce sparsity in reconstructions. The total variation norm (or $L_1$ norm) can be one particular choice. The total variation norm is a method for reducing noise in images while preserving the representation of edges. Typically, the method is performed by applying a so-called sparsifying transformation to the estimated imagery, like a spatial gradient, if the underlying image itself is not already a sparse entity. When prior images are utilized in a reconstruction, one would expect that the difference between a registered prior image and the new reconstruction is sparse, having significant values only in regions of change. In some cases, additional sparsifying transforms are applied even though this difference may already be sparse. If the prior image is not well-registered, one would expect there to be more significant differences, and the prior image therefore would have decreased utility. As such, PICCS approaches that include an initial prior image registration are known in the art.

However, there are drawbacks with the known methods of image reconstruction. For example, while there are modifications to PICCS that accommodate misregistration, such techniques are applied as a pre-processing step as opposed to simultaneous processing that would leverage intermediate reconstructions to improve the registration, perhaps as part of an iterative procedure. Another potential issue with such compressed sensing reconstructions is that they tend to adopt a simplified forward model and no noise model. This is usually required in order to apply a linear constraint on a compressing sensing objective. Likelihood-based approaches are also known. However, while likelihood methods can make use of fairly sophisticated forward models, they have not incorporated prior images in their objective function.

Each of the foregoing approaches is used to minimize a compressed sensing or total variation type norm on the imagery subject to a constraint that observed data matches the reprojected image estimate. This is typically applied as a linear constraint matching the log-transformed data with the reprojected estimate. While this approach is attractive since it strictly enforces the data match criterion, it does not recognize that different measurements may contain different information content. For example, it is common to presume that x-ray measurements follow a Poisson noise distribution. As such, the noise variance can be substantially space-variant with different rays possessing very different signal-to-noise ratios. In fact, it appears that PICCS may presume some kind of noise model that is homoscedastic having the same variance in the log-transformed measurement space.

SUMMARY

A method for processing an image of a series of images includes receiving first data representing a first previously reconstructed image and receiving second data representing a second image. A second image is reconstructed in accordance with the first data, the second data and a noise model. The noise model is a likelihood estimation. The second image is reconstructed in accordance with a penalty function. The penalty function is a roughness penalty function. The penalty function is updated by iteratively adjusting an image volume estimate. The penalty function is updated by iteratively adjusting a registration term. The penalty function is a prior image penalty function and the prior image penalty function and a registration term are jointly optimized. The penalty function is determined in accordance with a noise model. The function is a p-norm penalty function.

The second image is reconstructed in accordance with a plurality of penalty functions. The plurality of penalty functions includes a first penalty function determined in accordance with the first data and a second penalty function determined in accordance with a roughness function of the second data. The first penalty function includes a penalty function determined in accordance with a difference between the first data and the second data.

The first and second images are registered in accordance with a registration parameter and an image parameter. The image parameter is an image volume. The registration parameter and an image parameter are jointly optimized by performing an optimization over the registration term with the image parameter fixed, performing an optimization over the image parameter with the registration term fixed; and repeating the steps until an objective function is maximized. The first image and the second image are registered jointly with reconstructing the second image. The first image and the second image are registered jointly with reconstructing the second image by adjusting a registration term and an image volume estimate.

A system for processing an image of a series of images includes first data representing a first previously reconstructed image, second data representing a second image; and a reconstructed second image provided in accordance with the first data, the second data and a noise model. The reconstructed second image is reconstructed in accordance with a likelihood. The reconstructed second image is reconstructed jointly with an adjustment of an image registration term.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
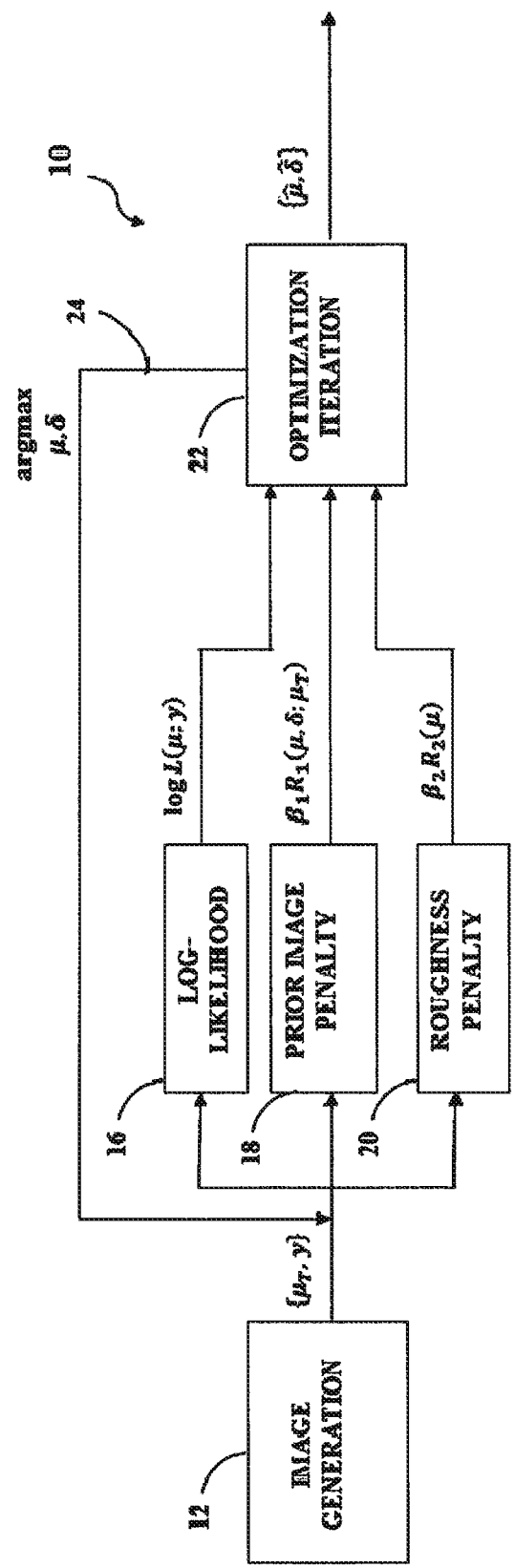
FIG. 1 shows a high level block diagram representation of an embodiment of the image reconstruction system.

Before the present methods and systems are disclosed and described, it is to be understood that the methods and systems are not limited to specific methods, specific components, or to particular configurations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of exemplary embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Referring now to FIG. 1, there is shown a high level block diagram representation of an embodiment of image reconstruction system 10. Image reconstruction system 10 is a hybrid estimator that is useful for reconstructing image data, especially images of a series of images. In image reconstruction system 10 images may be registered and reconstructed based upon a likelihood function, a prior image and a noise model. Penalty terms may be calculated and parameterized along with registration terms. Thus, the image reconstruction provided by the image reconstruction system 10 can be based upon a combination of a noise model and a prior image. Furthermore, the registration term and the penalty function may be jointly optimized within image reconstruction system 10, to thereby discourage differences between the images and to allow for misregistration of images simultaneously.

Image reconstruction system 10 can include an image generation device 12, which can provide a series of images. For example, image generation device 12 can be a tomographic device, a magnetic resonance imaging device or any other direct or indirect imaging device. Furthermore, the images provided by image generation device 12 can be from any type of repeated image acquisitions. For example, the images can be a part of a series of CT images used for diagnostics or image-guided procedures. The images may, for example, be a series of images for monitoring nodule size over the course of treatment of a lung cancer patient, or images provided by a CT device operating in the cine mode for guiding a biopsy needle or other device.

Image reconstruction system 10 may also include likelihood system 16, which can receive its input from the output of image generation device 12. Furthermore, likelihood system 16 can be a log-likelihood system 16 making use of forward models to relate measurements from device 12 to the images that are to be formed. The forward models used by log-likelihood system 16 can be any forward models known to those skilled in the art. The output of log-likelihood system 16 is a function of both the measurements made by image generation device 12 and the underlying parameter values that specify the reconstructed output image.

Prior image penalty system 18 can also be included in image reconstruction system 10. Prior image penalty system 18 can receive an input from the output of image generation device 12, and apply a penalty function that discourages differences between an image being reconstructed and a previously reconstructed or previously processed prior image. In the penalty function of prior image penalty system 18 a calculated penalty can be parameterized with a registration term. The registration term and the penalty function are jointly optimized in prior image penalty system 18, as part of the reconstruction performed by image reconstruction system 10, in order to both discourage differences between the images and to allow for misregistration of images simultaneously.

Image reconstruction system 10 can also include roughness penalty system 20, which can also receive an input from the output of image generation device 12. When performing radiation studies of a patient, it is desirable to perform the studies with as low a dose of radiation possible, in order to limit the radiation related risk to the patient. However, lower doses of radiation produce noisier data. Furthermore, noisier data causes image reconstruction system 10 to produce blurrier reconstructed images. Therefore, roughness penalty system 20 can provide a roughness penalty term for penalizing noisy data. For example, a roughness penalty term can enhance reconstruction of sparse data for balancing the stochastic fluctuations of low radiation dose measurements with spatial resolution requirements.

Optimization iteration system 22 can simultaneously receive, as its inputs, the outputs of log-likelihood system 16, prior image penalty system 18, and roughness penalty system 20. Furthermore, optimization iteration system 22 can use its received inputs to provide an estimation term, and determine whether the estimation term is maximized. Accordingly, optimization iteration system 22 can repeatedly transfer operation of image reconstruction system 10 back to the inputs of systems 16, 18, 20 by way of loop 24. The optimization transfers back to the inputs of systems 16, 18, 20 can repeat until the objective function is maximized. Image reconstruction system 10 can adjust selected image and registration parameters when transferring operation to systems 16, 18, 20, in order to iteratively maximize the objective function. For example, optimization iteration system 22 may weigh parameters with a high variance less heavily than parameters with a low variance. Accordingly, an embodiment of image reconstruction system 10 can provide a prior image penalized objective function.

In this manner, image reconstruction system 10 can iteratively optimize selected terms in its inputs in order to yield a maximum-likelihood-based estimate, as described in more detail below. Thus, the image reconstruction system 10 is a likelihood-based estimator, wherein the estimator can have two penalty functions, as described in more detail below. One penalty function can incorporate prior image information. The second penalty function can discourage image roughness/noise. The objective function can also permit joint registration of the prior images. Thus, the operations of image reconstruction system 10 can be referred to as prior image with registration, penalized-likelihood estimation (PIRPLE).

Accordingly, the objective function of image reconstruction system 20 can be represented by Eqn. (1) below:

$$\{\hat{\mu}, \hat{\delta}\} = \underset{\mu, \delta}{\operatorname{argmax}} \log L(\mu; y) - \beta_1 R_1(\mu, \delta; \mu_T) - \beta_2 R_2(\mu) \quad \text{Eqn. (1)}$$

$$\text{where } \begin{cases} R_1(\mu, \delta; \mu_T) = \|\mu - W(\delta)\mu_T\|_p \\ R_2(\mu) = \|\Psi\mu\|_p \end{cases}.$$

The first term on the right hand side of Eqn. (1) represents a log-likelihood function operating upon an image volume estimate μ, for example an attenuation volume μ in CT, and measurement inputs y from the image generation device 12. The first term of Eqn. (1) thus corresponds to the operations of log-likelihood system 16. The second term on the right hand side of Eqn. (1) represents a penalty function that can operate upon the image volume estimate μ a set of image registration parameters δ, and a parameter representative of a prior image $\mu_T$ of the series of images from image generation device 12. The second term of Eqn. (1) thus corresponds to the operations of prior image penalty system 18. The third term on the right hand side represents a roughness penalty function that can operate upon the image volume estimate μ. The third term of Eqn. (1) thus corresponds to the operations of roughness penalty system 20. Thus, image reconstruction system 10 is a hybrid estimator which can reconstruct images using both a likelihood-based method and a prior image method.

Therefore, PIRPLE utilizes prior image information, compressed-sensing penalties, a noise model for measurements, and allows for joint registration of the prior images as part of the reconstruction. PIRPLE is able to retain image quality under situations where both significant noise and undersampling are present in the measurements from image generation device 12. This permits separate simultaneous methods for providing improved performance over known image reconstruction systems. For example, radiation doses can be reduced, for example, in CT applications. Alternately, improved image acquisition speeds can be obtained, for example, in CT or magnetic resonance imaging applications.

Figure 2:
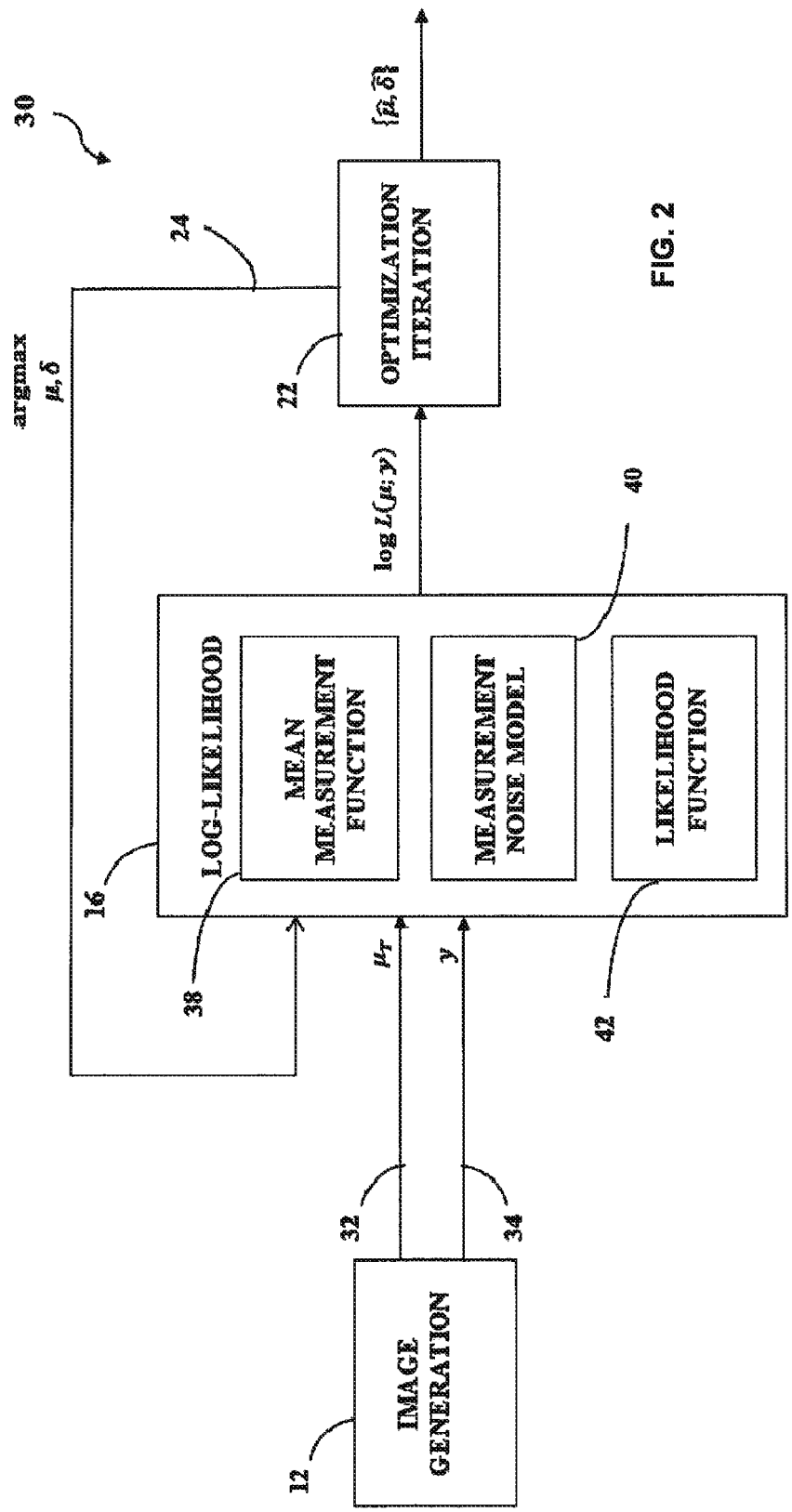
FIG. 2 shows a more detailed block diagram representation of an embodiment of the log-likelihood device of the image reconstruction system.

Referring now to FIG. 2, there is shown a block diagram representation of image reconstruction system 30. Image reconstruction system 30 is an alternate embodiment of image reconstruction system 10. Furthermore, image reconstruction system 30 includes a more detailed block diagram representation of log-likelihood system 16. The operation of log-likelihood system 16 is represented as the first term on the right side of Eqn. (1), as previously described. Log-likelihood system 16 can receive its inputs from the output of image generation device 12. The prior image $\mu_T$ is received from image generation device 12 by way of line 32, and the measurement inputs y are received by way of line 34. Log-likelihood system 16 can thus provide an output which is a function of both the underlying parameter values that specify the output image, and the measurements made by image generation device 12.

Log-likelihood system 16 of image reconstruction system 30 can include mean measurement function 38, measurement noise model 40, and likelihood function 42. For computed tomography, mean measurement function 38 can use a general sparse measurement model to provide a mean measurement $\bar{y}$ based upon a discretized object $\mu$ as shown in Eqn. (2):

$$\bar{y} = I_0 \exp(-A\mu) \qquad \text{Eqn. (2)}$$

where $I_0$ is the number of photons for each projection ray. The photons represented by $I_0$ may be unattenuated photons. The value A in Eqn. (2) can represent the system matrix that is the discrete projection operator, for all angles and detector elements.

Any arbitrary noise model may be assumed for the measurements of measurement noise model 40 within log-likelihood system 16, wherein the noise can be assumed to be independent of the measurement inputs y. However, in one embodiment of measurement noise model 40, the commonly applied Poisson model can be selected. Assuming a Poisson distribution of the noise in the measurement inputs y from the noise generation device 12, the operation of measurement noise model 40 can be represented as shown in Eqn. (3):

$$y_i \sim Poisson \to p(y_i \mid \mu) = \exp[-\bar{y}_i(\mu)] \frac{[\bar{y}_i(\mu)]^{y_i}}{y_i!} \qquad \text{Eqn. (3)}$$

The likelihood function of log-likelihood device 16 is then as shown in Eqn. (4):

$$L(y; \mu) = p(y \mid \mu) = \prod_{i=1}^{N} p(y_i \mid \mu) = \prod_{i=1}^{N} \exp[-\bar{y}_i(\mu)] \frac{[\bar{y}_i(\mu)]^{y_i}}{y_i!} \qquad \text{Eqn. (4)}$$

Assuming independent measurements and dropping inconsequential constant terms, the combination of Eqns. (2), (3), (4), can provide the representation of log-likelihood function of log-likelihood system 16 as shown in Eqn. (5):

$$\log L(y; \mu) \cong \sum_{i=1}^{N} y_i \log[I_0 \exp(-A\mu)]_i - [I_0 \exp(-A\mu)]_i \qquad \text{Eqn. (5)}$$

Maximization of Eqn. (5) alone can yield a maximum likelihood estimate. However, the additional terms of Eqn. (1) represent a modified objective function having a penalized-likelihood solution.

Figure 3:
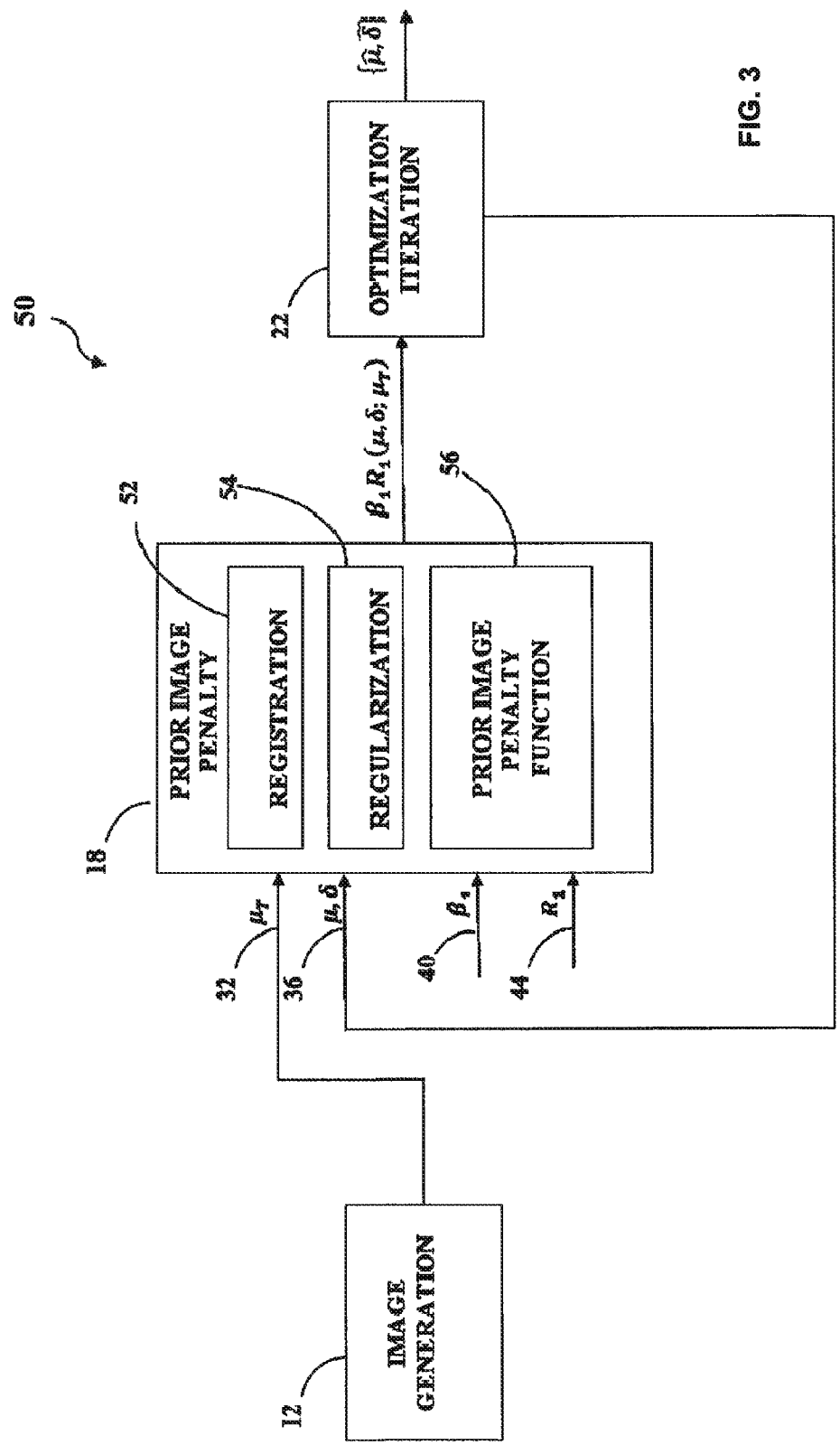
FIG. 3 shows a more detailed block diagram representation of an embodiment of the prior image penalty device of the image reconstruction system.

Referring now to FIG. 3, there is shown a block diagram representation of image reconstruction system 50. Image reconstruction system 50 is an alternate embodiment of image reconstruction system 10. Furthermore, image reconstruction system 50 includes a more detailed block diagram representation of prior image penalty system 18, wherein prior image penalty system 18 can include registration module 52, regularization module 54, and prior image penalty function 56. The operation of prior image penalty system 18 can be represented as the second term on the right side of Eqn. (1).

As previously described, prior image penalty system 18 can receive a prior image input $\mu_T$ from the output of image generation device 12. The prior image input $\mu_T$ can be received by way of line 32. Prior image penalty system 18 can also receive an image volume estimate $\mu$ and a registration term $\delta$ from optimization iteration system 22. The image volume estimate $\mu$ and the registration term $\delta$ can be received from optimization iteration system 22 by way of line 36.

Registration module 52 of prior image penalty system 18 can use the information $\mu_T$ and the registration term $\delta$ to register images of the series of images received from image generation device 12. Thus, image reconstruction system 10 can perform a reconstruction using both a noise model, such as measurement noise model 40 of log-likelihood system 16, and a previously reconstructed or previously processed prior image. Furthermore, in image reconstruction system 10 images can be registered and reconstructed based upon a likelihood function, information $\mu_T$ regarding a prior image, and a noise model.

A regularization parameter $\beta_1$ can also be provided to prior image penalty system 18 in order to control the weight the output term of prior image penalty system 18. The value of the regularization parameter $\beta_1$ can be selected by a user of the image reconstruction system 10, and the user selected value can be applied to the prior image penalty system 18 by way of line 58. When higher values of the regularization parameter $\beta_1$ are selected, more of the prior image information can appear in the output term of the image reconstruction system 10. Selecting lower values of the regularization parameter $\beta_1$ can result in less prior image information appearing in the output term. Optimization of the objective function of Eqn. (1) is adapted to balance the amount of the prior image information in the reconstructed image of image reconstruction system 10. The weighting of the output term can be performed using the user selected regularization parameter $\beta_1$ in regularization module 54 of prior image penalty system 18.

Prior image penalty system 18 can also apply a penalty function to the inputs it receives from image generation device 12. The penalty function of prior image penalty system 18 is represented as $R_1$. In one embodiment, the penalty function $R_1$ can be a p-norm penalty function that is well known to those skilled in the art. In an embodiment the p-norm of prior image penalty system 18 can be modified to ensure differentiability at zero. The penalty function $R_1$ can discourage differences between an image being reconstructed and a previously reconstructed or previously processed prior image. Optimization iteration system 22 also iteratively updates the penalty function $R_1$, by iteratively adjusting the values of the image volume estimate µ and the registration term δ. The updated values of the penalty function $R_1$ can then be applied to the input of prior image penalty system 18 during each iteration cycle of the optimization iteration system 22. The penalty function $R_1$ is applied to the input of prior image penalty system 18 by way of line 44.

Thus, in prior image penalty system 18 a calculated penalty is parameterized with a registration term δ in registration module 52. The registration term δ and the penalty function are jointly optimized within prior image penalty system 18, as part of the reconstruction performed by image reconstruction system 10. Jointly optimizing the registration term δ and the penalty function both: (i) discourages differences between the images, and (ii) allows for misregistration of images simultaneously. Furthermore, the joint registration process of registration term δ and the penalty function can permit the use of unregistered prior images in image reconstruction system 10. The joint registration process can also take advantage of an iterative update process, whereby an improved reconstruction estimate can be used to improve the registration estimate. The improved registration estimate can then be used in turn to improve the reconstruction. Accordingly, the output term of prior image penalty system 18, $\beta_1 R_1 (\mu,\delta;\mu_T)$, can be the prior image penalty term of Eqn. (1) of image reconstruction system 10.

Figure 4:
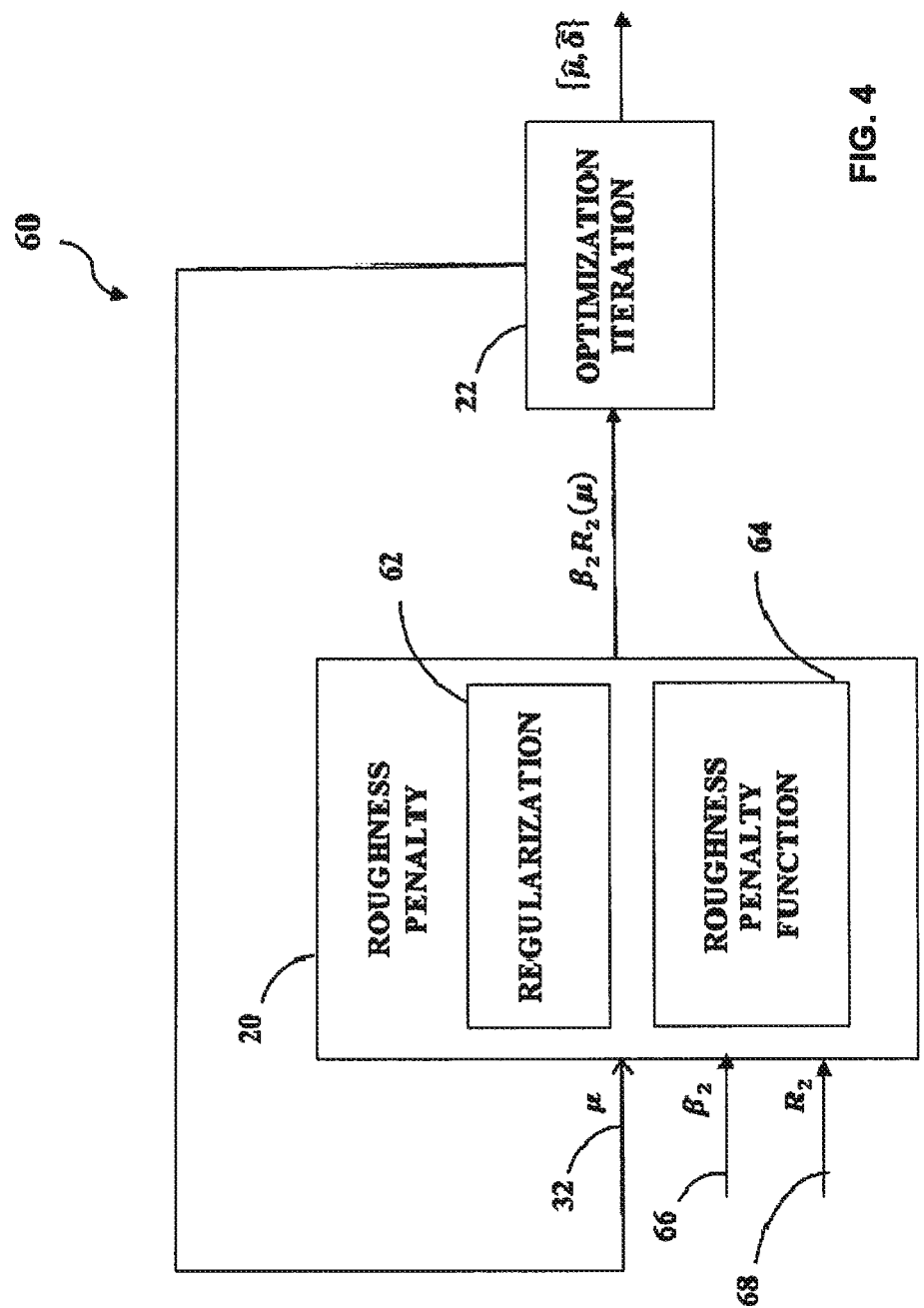
FIG. 4 shows a more detailed block diagram representation of an embodiment of the roughness estimate device of the image reconstruction system.

Referring now to FIG. 4, there is shown a block diagram representation of image reconstruction system 60. Image reconstruction system 60 is an alternate embodiment of image reconstruction system 10. Furthermore, image reconstruction system 60 includes a more detailed block diagram representation of roughness penalty system 20. Roughness penalty device can include regularization module 62 and roughness penalty function 64. As previously described, roughness penalty system 20 can receive an input image volume estimate µ from the output of image generation device 12. The input µ is received by way of line 32. The operation of roughness penalty system 20 is represented as the third term on the right side of Eqn. (1).

A regularization parameter $\beta_2$ can also be provided to roughness penalty system 20, in order to control the weight the output term of roughness penalty system 20. The value of the regularization parameter $\beta_2$ can be selected by a user of the image reconstruction system 10, and the user selected value can be applied to roughness penalty system 20 by way of line 66. When higher values of the regularization parameter $\beta_2$ are selected, greater penalties on roughness can appear in the output term of the roughness penalty system 20. Selecting lower values of the regularization parameter $\beta_2$ can result in less roughness penalty in the output term. The weighting of the output term can be performed using the user selected regularization parameter $\beta_2$ in regularization module 62 of roughness penalty system 20.

Roughness penalty system 20 also applies a penalty function to the inputs it receives from image generation device 12. The penalty function of roughness penalty system 18 is represented as $R_2$. It will be understood that higher roughness can result in higher blurriness and less noise in the reconstructed image of image reconstruction system 10. In one embodiment, the roughness penalty function $R_2$ can be a p-norm penalty function that is well known to those skilled in the art. The p-norm roughness penalty function $R_2$ operates upon a sparsified volume estimate. Optimization iteration system 22 iteratively updates the roughness penalty function $R_2$. The updated values of the roughness penalty function $R_2$ can then be applied to the input roughness penalty device 12 during each iteration cycle of the optimization iteration system 22 by roughness penalty function 64. The penalty function $R_2$ is applied to the input of roughness penalty device 20 by way of line 68.

Figure 5:
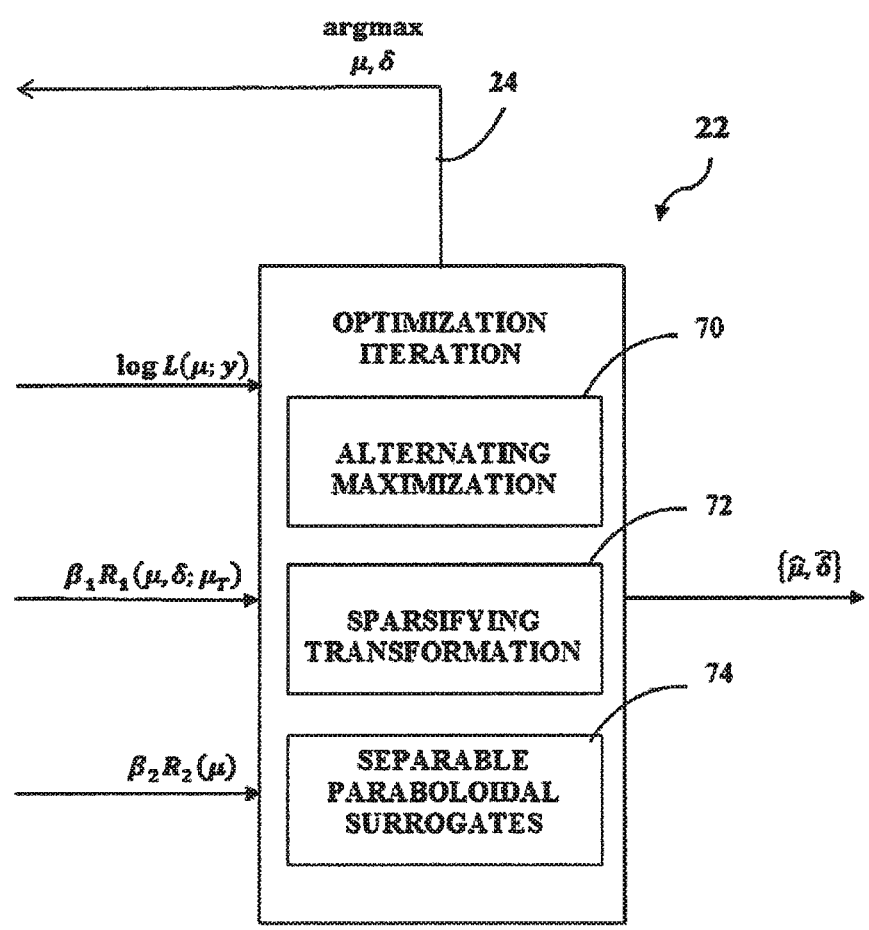
FIG. 5 shows a more detailed block diagram representation of an embodiment of the optimization iteration device of the image reconstruction system.

Referring now to FIG. 5, there is shown a more detailed block diagram representation of optimization iteration system 22. As previously described, optimization iteration system 22 can simultaneously receive, as its inputs, the outputs of jointly operating log-likelihood system 16, prior image penalty system 18, and roughness penalty system 20. Furthermore, optimization iteration system 22 can use the inputs received from systems 16, 18, 20 to provide updated estimation terms. Optimization iteration system 22 can also determine whether the estimation term is maximized.

The objective function of Eqn. (1) can be solved using an alternating maximization approach. In the alternating maximization approach an optimization can be performed over µ with a fixed δ. A further optimization can subsequently be performed over δ with a fixed µ. This process can then be repeated until the objective is maximized. Thus, image reconstruction system 10 can jointly refine the image estimate and the registration parameters. Furthermore, the alternating iterative process permits image reconstruction system 10 to discourage differences between the images, while simultaneously allowing for misregistration of images. This alternating maximization method works for both rigid and non-rigid or deformable registrations of previously acquired images. The alternating maximization operation may be performed in the alternating maximization module 70 in optimization iteration system 22.

When prior images are utilized in a reconstruction by the image reconstruction system 10, the difference between a registered prior image and a new reconstruction may be sparse, if both images have significant values only in regions of change. However, in some cases, additional sparsifying transforms may be applied. The additional sparsifying transforms may be applied even if the difference between the images is already sparse.

Accordingly, image reconstruction system 10 can be provided with a sparsifying operator Ψ and a registration transformation operator W. In one embodiment, a sparsifying operator $\Psi_1$ may be provided for determining the value of $R_1$, and thereby determining the prior image penalty term of prior image penalty system 18. A second sparsifying operator $\Psi_2$, differing from the sparsifying operator $\Psi_1$, may be provided for determining the value of $R_2$, and thereby determining the roughness penalty term at the output of roughness penalty system 20. Furthermore, providing the two sparsifying operators, and $\Psi_1$ and $\Psi_2$, can permit image reconstruction system 10 to provide different p-norm penalties for prior image penalty system 18 and roughness penalty system 20.

While a spatial gradient operator can be used, it will be understood that any sparsifying operator may be used for sparsifying data in image reconstruction system 10. Additionally, registration transformation operator W may be implemented using a kernel-based interpolation scheme with differentiable kernels. The sparsifying operations performed in image reconstruction system 10 may be performed in data sparsifying module 72 of optimization iteration system 22.

In order to facilitate the iterative optimization of the objective function represented as Eqn. (1), separable paraboloidal surrogates that are easier to solve than the objective function may be used. The applicable mathematical constraints that must be met in order to use such separable paraboloidal surrogates are known to those skilled in the art. For example, the surrogates must match the value of the objective at the current estimate. Furthermore, the derivative of the surrogates must match the derivative of the objective at the current estimate. Additionally, the surrogate must lie everywhere below the objective function (in the feasible region). Surrogates meeting these criteria may be guaranteed to converge monotonically for image updates.

Separable paraboloidal surrogates iterations may be used, for example, for the attenuation coefficients. Furthermore, a quasi-Newton approach based on Broyden-Fletcher-Goldfarb-Shanno (BFGS) updates may be used for the registration parameters. Specifically, for the optimization, separable paraboloidal surrogate iterations are applied for a fixed $\delta$ followed by conjugate gradient iterations for a fixed $\mu$. The separable paraboloidal surrogates may be used in separable paraboloidal surrogates module 74.

Figure 6:
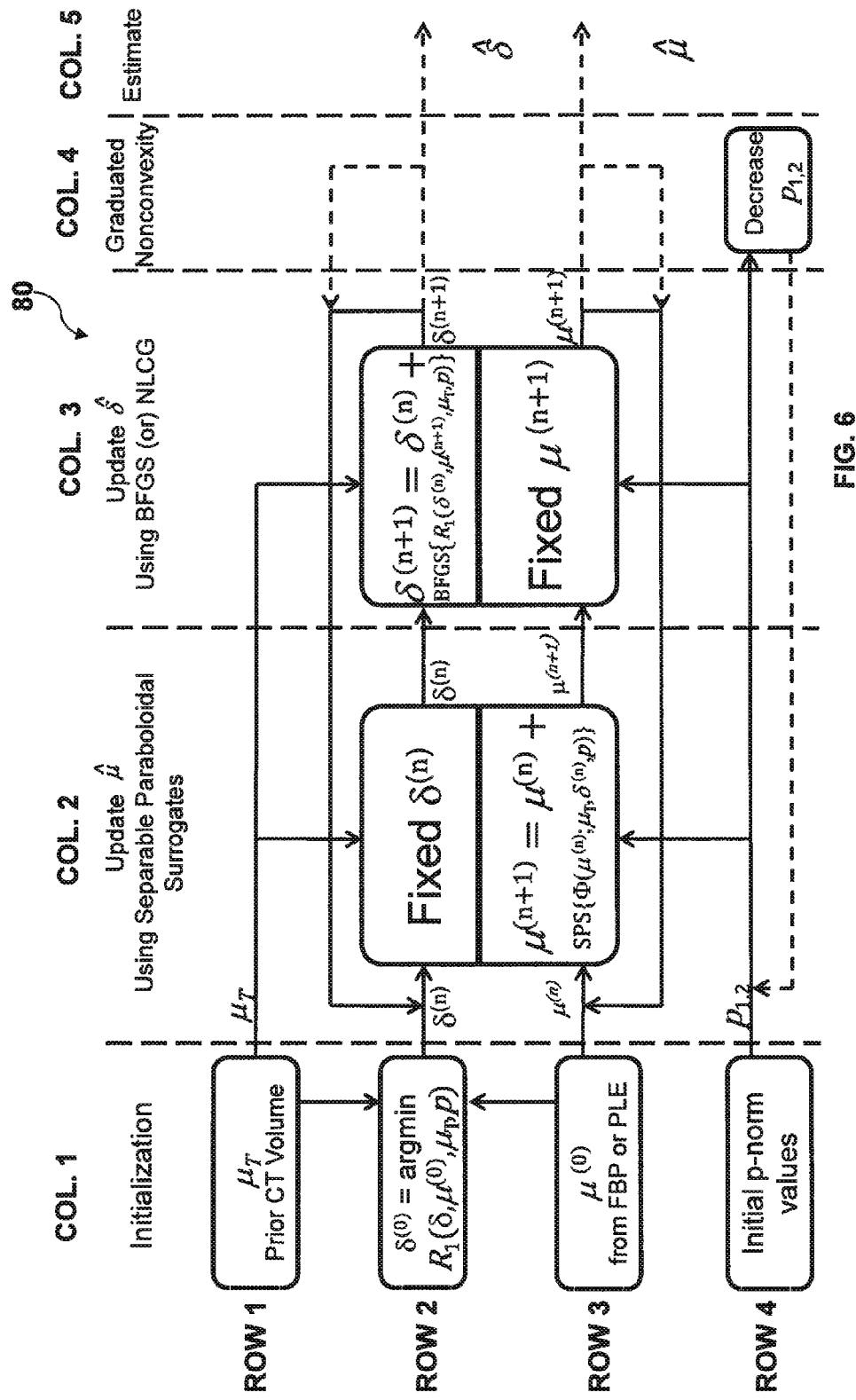
FIG. 6 shows a more detailed block diagram representation of an embodiment of the image reconstruction system.

Referring now to FIG. 6, there is shown image reconstruction system 80. Image reconstruction system 80 is a more detailed block diagram representation of an embodiment of the image reconstruction system 10. For illustrative purposes image reconstruction system 10 is divided into Columns 1, 2, 3, 4, 5, and Rows 1, 2, 3.

Column 1 of image reconstruction system 80 is the initialization column. It describes how a user chooses to start the initialization process of image reconstruction system 80 for maximizing the objective function of Eqn. (1). For example, in Row 1 of Column 1 the initial value of a volume parameter $\mu_T$, representative of a prior image, can be set equal to a prior CT volume. In Row 2 of Column 1, the initial value of the image registration parameter $\delta$ can be set equal to $\delta^{(0)}$ (based on an initial reconstruction and registration) wherein the superscript zero indicates that $\delta^{(0)}$ is the value of $\delta$ going in the first iteration of image reconstruction system 80. In Row 3 the image volume estimate $\mu$ is given the initial value $\mu^{(0)}$, which may come from a Filtered Back Projection (FBP) or a Penalized Likelihood Estimation (PLE). In Row 4 of Column 1 initial values of p-norm can be assigned. The selection of the initial values of p-norm will be discussed in more detail below.

Column 2 and Column 3 of image reconstruction system 80, taken together, can represent the alternating iteration of Eqn. (1). In Column 2, the value of $\hat{\mu}$ can be iteratively updated while the value of $\hat{\delta}$ is fixed. More specifically, the value of $\hat{\mu}$ is updated when the value of $\mu^{(n)}$ is inputted into Column 2, and the value of $\mu^{(n+1)}$ is outputted from Column 2 after the iteration. Thus, the value $\hat{\mu}$ is updated in Column 2. Additionally, the value of $\delta^{(n)}$ is inputted into Column 2, and the same value $\delta^{(n)}$ is outputted from Column 2 after the iteration. Thus, the value of $\hat{\delta}$ is not updated in Column 2.

The process of optimizing the objective function of Eqn. (1) can then alternate to iteratively updating the value of $\hat{\delta}$ while the value of $\hat{\mu}$ is fixed, as shown in Column 3. The value of $\delta^{(n)}$ is inputted into Column 3, and the value of $\delta^{(n+1)}$ is outputted from Column 3 after the after the iteration. Thus, the value $\hat{\delta}$ is updated in Column 3. Additionally, the value of $\mu^{(n+1)}$ is inputted into Column 3, and the same value $\mu^{(n+1)}$ is outputted from Column 3 after the iteration. Thus, the value of $\hat{\mu}$ is not updated in Column 3. The process of optimizing the objective function of Eqn. (1) can then alternate to iteratively updating the value of $\hat{\mu}$ while the value of $\hat{\delta}$ is fixed. The values $\{\hat{\mu}, \hat{\delta}\}$ are provided at the output of image reconstruction system 80. These operations may be performed using BFGS or Nonlinear Conjugate Gradients (NLCG).

The arrows shown in the representation of the image registration system 80 can show the possible flows of the processing performed when iteratively maximizing the objective function. For example, the $\delta^{(n+1)}$ arrow from an output of Column 3, pointing back to an input of Column 2, provides the iterated registration term for another iteration. The $\mu^{(n+1)}$ arrow from an output of Column 3, pointing back to an input of Column 2, provides an iterated image volume estimate for another iteration. The dotted line can show some of the optional paths that image reconstruction system 80 can take.

Row 4 of image reconstruction system 80 describes the process of initializing and adjusting a prior image penalty. In Column 1 of Row 4 an initial value of p-norm can be provided. It may be preferable to provide a nonconvex optimization by choosing a value p<1. It may be more difficult to obtain a solution to an objective function if a nonconvex optimization is performed due to a value of p<1. However, if a value of p<1 is chosen, the nonconvexity may be handled by using a graduated nonconvexity approach. In a graduated nonconvexity approach the optimization can start with a value p>1 and reduce the value of p gradually during the optimization process, as shown in Column 4 of Row 4. Using this approach p can be reduced toward a target value, for example p=0.5.

Figure 7:
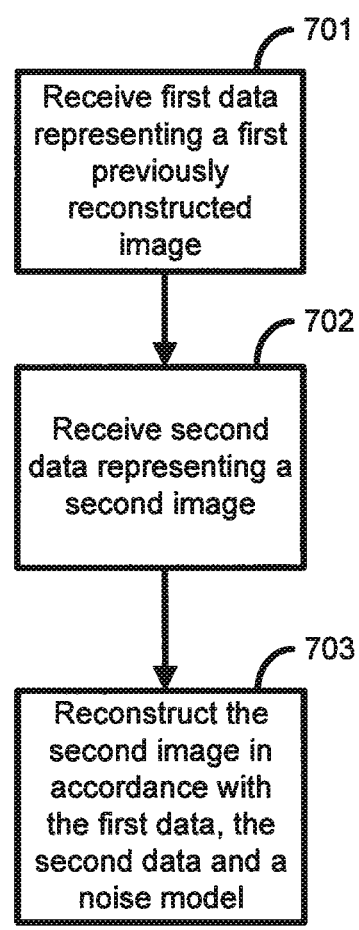
FIG. 7 is a flowchart illustrating an exemplary method.

In an aspect, illustrated in FIG. 7, provided are methods and systems for processing an image of a series of images, comprising receiving first data representing a first previously reconstructed image at 701, receiving second data representing a second image at 702, and reconstructing the second image in accordance with the first data, the second data and a noise model at 703. In an aspect, the noise model can comprise a likelihood estimation.

The methods and systems can further comprise reconstructing the second image in accordance with a penalty function. In an aspect, the penalty function can comprise a roughness penalty function. The methods and systems can further comprise updating the penalty function by iteratively adjusting an image volume estimate. In an aspect, updating the penalty function can comprise iteratively adjusting a registration term. The penalty function can be a prior image penalty function further comprising jointly optimizing the prior image penalty function and a registration term. In an aspect, the penalty function can be determined in accordance with a noise model. The penalty function can comprise a p-norm penalty function.

In an aspect, the methods and systems can comprise reconstructing the second image in accordance with a plurality of penalty functions. The plurality of penalty functions can comprise a first penalty function determined in accordance with the first data and a second penalty function determined in accordance with a roughness function of the second data. The first penalty function can comprise a penalty function determined in accordance with a difference between the first data and the second data. The methods and systems can further comprise registering the first and second images in accordance with a registration parameter and an image parameter. The image parameter can be an image volume. In an aspect, the methods and systems can further comprise jointly optimizing the registration parameter and an image parameter. Jointly optimizing the registration parameter and the image parameter can further comprise (a) performing an optimization over the registration term with the image parameter fixed, (b) performing an optimization over the image parameter with the registration term fixed, and repeating steps (a) and (b) until an objective function is maximized.

In an aspect, the methods and systems can further comprise registering the first image and the second image jointly with reconstructing the second image. In an aspect, the methods and systems can still further comprise registering the first image and the second image jointly with reconstructing the second image by adjusting a registration term and an image volume estimate.

One skilled in the art will appreciate that provided is a functional description and that the respective functions can be performed by software, hardware, or a combination of software and hardware. In one exemplary aspect, the units can comprise a computer 801 as illustrated in FIG. 8 and described below.

Figure 8:
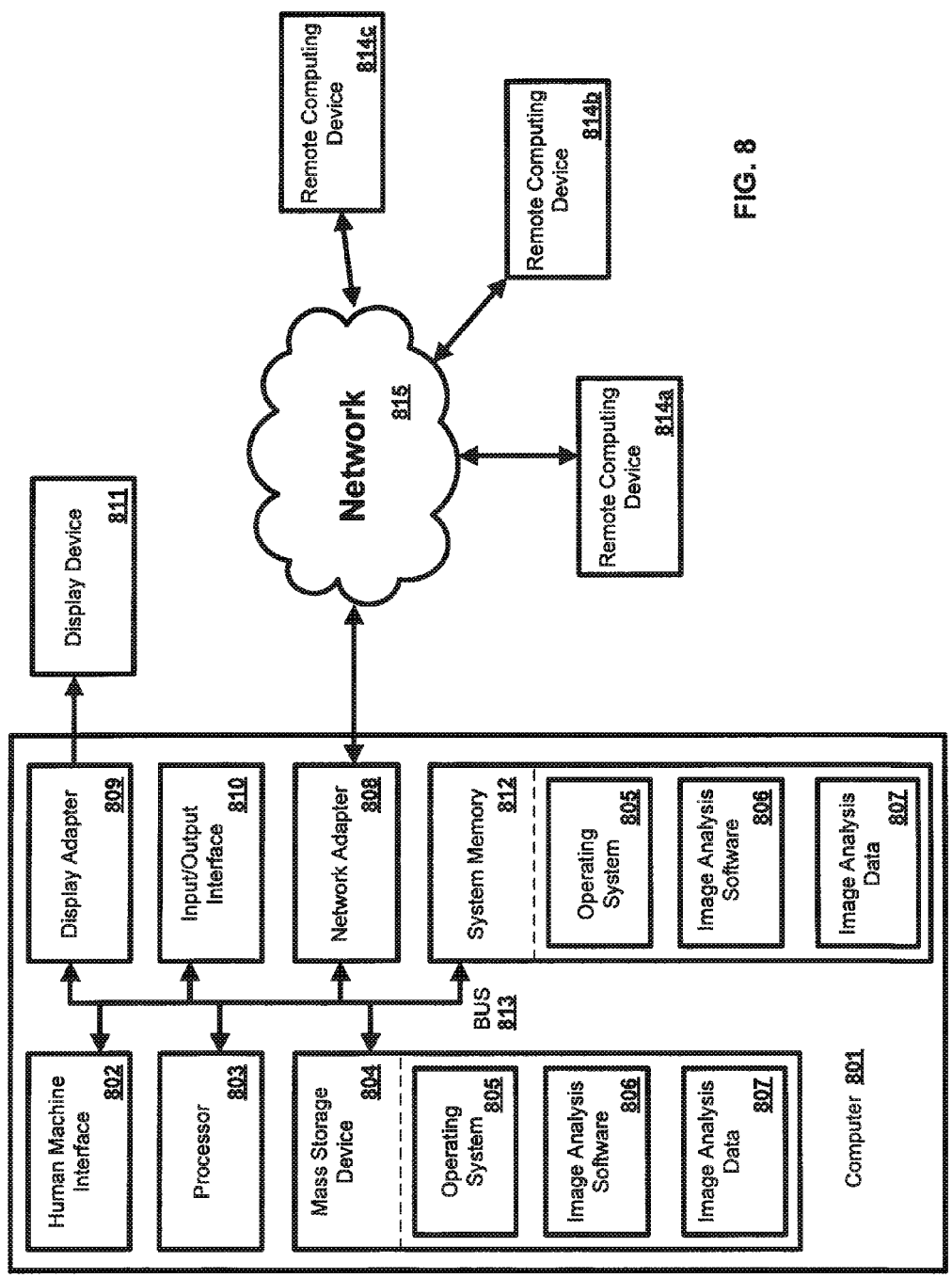
FIG. 8 is an exemplary operating environment.

FIG. 8 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 801. The components of the computer 801 can comprise, but are not limited to, one or more processors or processing units 803, a system memory 812, and a system bus 813 that couples various system components including the processor 803 to the system memory 812. In the case of multiple processing units 803, the system can utilize parallel computing.

The system bus 813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the processor 803, a mass storage device 804, an operating system 805, image processing software 806, image processing data 807, a network adapter 808, system memory 812, an Input/Output Interface 810, a display adapter 809, a display device 811, and a human machine interface 802, can be contained within one or more remote computing devices 814a,b,c at physically separate locations, connected through buses of this form, in effect implementing a fully distributed system.

The computer 801 typically comprises a variety of computer readable media. Exemplary readable media can be any available media that is accessible by the computer 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as image processing data 807 and/or program modules such as operating system 805 and image processing software 806 that are immediately accessible to and/or are presently operated on by the processing unit 803.

In another aspect, the computer 801 can also comprise other removable/non-removable, volatile/non-volatile computer storage media. By way of example, FIG. 8 illustrates a mass storage device 804 which can provide non-volatile storage of computer code, computer readable instructions, data structures, program modules, and other data for the computer 801. For example and not meant to be limiting, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, an operating system 805 and image processing software 806. Each of the operating system 805 and image processing software 806 (or some combination thereof) can comprise elements of the programming and the image processing software 806. Image processing data 807 can also be stored on the mass storage device 804. Image processing data 807 can be stored in any of one or more databases known in the art. Examples of such databases comprise, DB2, Microsoft® Access, Microsoft® SQL Server, Oracle®, mySQL, PostgreSQL, and the like. The databases can be centralized or distributed across multiple systems.

In another aspect, the user can enter commands and information into the computer 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 803 via a human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, a display device 811 can also be connected to the system bus 813 via an interface, such as a display adapter 809. It is contemplated that the computer 801 can have more than one display adapter 809 and the computer 801 can have more than one display device 811. For example, a display device can be a monitor, an LCD (Liquid Crystal Display), or a projector. In addition to the display device 811, other output peripheral devices can comprise components such as speakers (not shown) and a printer (not shown) which can be connected to the computer 801 via Input/Output Interface 810. Any step and/or result of the methods can be output in any form to an output device. Such output can be any form of visual representation, including, but not limited to, textual, graphical, animation, audio, tactile, and the like.

The computer 801 can operate in a networked environment using logical connections to one or more remote computing devices 814$a,b,c$. By way of example, a remote computing device can be a personal computer, portable computer, a server, a router, a network computer, a peer device or other common network node, and so on. Logical connections between the computer 801 and a remote computing device 814$a,b,c$ can be made via a local area network (LAN) and a general wide area network (WAN). Such network connections can be through a network adapter 808. A network adapter 808 can be implemented in both wired and wireless environments. Such networking environments are conventional and commonplace in offices, enterprise-wide computer networks, intranets, and the Internet 815.

For purposes of illustration, application programs and other executable program components such as the operating system 805 are illustrated herein as discrete blocks, although it is recognized that such programs and components reside at various times in different storage components of the computing device 801, and are executed by the data processor(s) of the computer. An implementation of image processing software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with exemplary embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for processing an image of a series of images, comprising:
receiving first data representing a first previously reconstructed image of an object;
receiving, from an imaging device, second data representing a second image of the object, wherein the first data represents the object at a first time and the second data represents the object at a second time subsequent to the first time; and
reconstructing the second image in accordance with the first data, the second data and a measurement noise model, wherein the measurement noise model is configured to model noise in the second data introduced by the imaging device, and wherein reconstructing the second image accounts for time-based differences between the first data and the second data.

2. The method for processing an image of claim 1, wherein the measurement noise model comprises a likelihood estimation.

3. The method for processing an image of claim 1, further comprising reconstructing the second image in accordance with a penalty function configured to penalize a feature in reconstructing the second image.

4. The method for processing an image of claim 3, wherein the penalty function comprises a roughness penalty function configured to penalize roughness or noise in reconstructing the second image.

5. The method for processing an image of claim 3, further comprising updating the penalty function by iteratively adjusting an image volume estimate.

6. The method for processing an image of claim 3, further comprising updating the penalty function by iteratively adjusting a registration parameter of the penalty function, wherein the registration parameter is configured to indicate a prior image for use in reconstructing the second image.

7. The method for processing data of claim 3, wherein the penalty function is a prior image penalty function, and further comprising jointly optimizing the prior image penalty function and a registration parameter configured to indicate a prior image for use in reconstructing the second image.

8. The method of claim 1, wherein the second image is reconstructed by iteratively optimizing an objective function, and wherein the objective function comprises a first term indicative of the measurement noise model and a second term configured to discourage time-based differences between the first previously reconstructed image and the second image.

9. The method for processing an image of claim 3, wherein the penalty function comprises a p-norm penalty function.

10. The method for processing an image of claim 1, further comprising reconstructing the second image in accordance with a plurality of penalty functions of an objective function, wherein reconstructing the second image comprises iteratively adjusting the plurality of penalty functions to optimize the objective function.

11. The method for processing an image of claim 10, wherein the plurality of penalty functions comprises a first penalty function determined in accordance with the first data and a second penalty function determined in accordance with a roughness function of the second data, wherein the roughness function is configured to penalize roughness or noise in reconstructing the second image.

12. The method for processing an image of claim 11, wherein the first penalty function comprises a penalty function determined in accordance with a difference between the first data and the second data.

13. The method for processing an image of claim 1, further comprising registering the first and second images in accordance with a registration parameter and an image parameter, wherein the registration parameter and the image parameters are parameters of a penalty term of an objective function solved in reconstructing the second image.

14. The method for processing an image of claim 13, wherein the image parameter is an image volume.

15. The method for processing an image of claim 13, further comprising jointly optimizing the registration parameter and an image parameter.

16. The method for processing an image of claim 15, wherein jointly optimizing the registration parameter and the image parameter further comprises: (a) performing an optimization over the registration parameter with the image parameter fixed; (b) performing an optimization over the image parameter with the registration parameter fixed; and (c) repeating steps (a) and (b) until an objective function is maximized.

17. The method for processing data of claim 1, further comprising registering the first image and the second image jointly with reconstructing the second image.

18. The method for processing data of claim 17, further comprising registering the first image and the second image jointly with reconstructing the second image by adjusting a registration parameter and an image volume estimate, wherein the registration parameter and the image volume estimate are terms of an objective function solved in reconstructing the second image.

19. A system for processing an image of a series of images, comprising:
a memory having encoded thereon computer-executable instructions; and
a processor functionally coupled to the memory and configured, by the computer-executable instructions, to perform at least the following actions,
receiving first data representing a first previously reconstructed image of an object,
receiving, from an imaging device, second data representing a second image of the object, wherein the first data represents the object at a first time and the second data represents the object at a second time subsequent to the first time, and
reconstructing a second image provided in accordance with the first data, the second data and a measurement noise model, wherein the measurement noise model is configured to model noise in the second data introduced by the imaging device, and wherein reconstructing the second image accounts for time-based differences between the first data and the second data.

20. The system for processing an image of claim 19, wherein the second image is reconstructed in accordance with a likelihood.

21. The system for processing an image of claim 19, wherein the second image is reconstructed jointly with an adjustment of an image registration parameter configured to indicate a prior image for use in reconstructing the second image.

* * * * *